(12) United States Patent
Rao (10) Patent No.: US 8,829,769 B1
(45) Date of Patent: Sep. 9, 2014

(54) COATED KEYBAR TO PROTECT ELECTRIC MACHINES

(71) Applicant: Dantam K. Rao, Niskayuna, NY (US)

(72) Inventor: Dantam K. Rao, Niskayuna, NY (US)

( * ) Notice: Subject to any disclaimer, the term of this patent is extended or adjusted under 35 U.S.C. 154(b) by 129 days.

(21) Appl. No.: 13/673,807

(22) Filed: Nov. 9, 2012

(51) Int. Cl.
*H02K 1/18* (2006.01)
*F16B 19/02* (2006.01)
*F16B 35/00* (2006.01)

(52) U.S. Cl.
CPC ............... *F16B 35/00* (2013.01); *F16B 19/02* (2013.01)
USPC ............. 310/432; 310/216.049; 310/216.051

(58) Field of Classification Search
CPC ........ H02K 1/185; H02K 1/182; H02K 1/187
USPC ........ 310/254.1, 432, 433, 216.049, 216.051, 310/216.083–216.086, 216.128, 216.133; 427/104, 126.3
See application file for complete search history.

(56) References Cited

U.S. PATENT DOCUMENTS

| | | | |
|---|---|---|---|
| 2,846,603 A * | 8/1958 | Webster et al. | 310/433 |
| 3,210,461 A | 10/1965 | Berg et al. | |
| 3,652,889 A | 3/1972 | Reece et al. | |
| 3,686,139 A | 8/1972 | Lubin | |
| 4,085,347 A | 4/1978 | Lichius | |
| 4,123,678 A | 10/1978 | Jacoby | |
| 4,485,320 A | 11/1984 | Kawada et al. | |
| 4,494,030 A * | 1/1985 | Mulach et al. | 310/256 |
| 4,564,779 A | 1/1986 | Terry | |
| 4,573,012 A | 2/1986 | Bisson et al. | |
| 4,714,798 A * | 12/1987 | Novak et al. | 136/239 |
| 4,948,529 A | 8/1990 | Ritchie et al. | |
| 4,965,142 A * | 10/1990 | Schmatz | 429/11 |
| 4,970,890 A | 11/1990 | Jaafar et al. | |
| 4,988,422 A | 1/1991 | Wirz | |
| 4,996,486 A | 2/1991 | Posedel | |
| 5,032,826 A | 7/1991 | Miller et al. | |
| 5,252,915 A | 10/1993 | Sedding et al. | |
| 5,321,362 A | 6/1994 | Fischer et al. | |
| 5,557,216 A | 9/1996 | Dailey et al. | |
| 5,635,785 A * | 6/1997 | Schwanda et al. | 310/270 |
| 5,918,359 A | 7/1999 | Neuenschwnder | |

(Continued)

OTHER PUBLICATIONS

Fowler Associates: ESD Journal—Ohms per square (non patent literature from internet source—http://www.esdjournal.com/techpapr/ohms.htm). 2011, all pages.*

(Continued)

*Primary Examiner* — Quyen Leung
*Assistant Examiner* — Naishadh Desai (57) ABSTRACT

A keybar or clamping bolt with a high-resistivity coating to protect an electric machine. The coating engages the laminations, flanges and frame rings and forms a part of electrical circuits through which harmful eddy currents circulate. One class of eddy currents, viz., core-fault currents, due to edge burrs or insulation defects, are forced to flow through this coating. The high resistance of the coating weakens the fault currents, preventing creation of hotspots that can cause core failure. Such coated keybar is in inexpensive alternative to traditional recoating and/or core-fault detection. Another class of eddy currents, viz., keybar currents, caused by overfluxing, are also forced to flow through this coating. The high resistance of the coating weakens the keybar currents, so prevents core-end overheating. A coated keybar also allows the machine to operate at higher leading power factor. It also prevents core-decompression hence protects the machine against loose laminations.

6 Claims, 6 Drawing Sheets

(56) References Cited

U.S. PATENT DOCUMENTS

| | | | |
|---|---|---|---|
| 6,462,457 B2 | 10/2002 | Shah et al. | |
| 7,675,123 B2* | 3/2010 | Leenders et al. | 257/390 |
| 8,179,028 B1* | 5/2012 | Rao | 310/433 |
| 2004/0080230 A1* | 4/2004 | Shah et al. | 310/179 |
| 2005/0235852 A1* | 10/2005 | Leenders et al. | 101/450.1 |
| 2007/0214982 A1* | 9/2007 | Klarmann et al. | 101/368 |
| 2008/0194146 A1* | 8/2008 | Gailus | 439/608 |

OTHER PUBLICATIONS

Coombs, et al. Review of the types, properties, advantages, and latest developments in insulating coatings on nonoriented electrical steels, IEEE Trans. Magnetics, vol. 17, N.

Edmonds, et al. Turbogenerator stator core study, Symp. Diagnostics for Electric Machines, Power Electronics and Drives, Sep. 2007, 441-446.

\* cited by examiner

COATED KEYBAR TO PROTECT ELECTRIC MACHINES

FIELD OF THE INVENTION

The present disclosure relates to protecting electric machines against destructive eddy currents caused by core-faults or overfluxing that can result in hotspots, core failure, core-end heating, core decompression or derating of the machine.

BACKGROUND

All motors, generators and transformers employ a stator core comprising a stack of compressed laminations. Means used to compress the laminations include clamping bolts or keybars as in U.S. Pat. Nos. 3,652,889; 4,564,779, through-bolts as in U.S. Pat. No. 7,223,920; 2010024461, welding as in U.S. Pat. No. 4,485,320, bonding as in U.S. Pat. Nos. 4,085,347, 4,123,678, cleating or interlocks as in U.S. Pat. No. 5,918,359.

Small and medium sized electric machines often employ simple round-sectioned steel bolts to compress the laminations. Large dynamoelectric machines on the other hand employ custom bolts with a dovetail, termed keybars, to compress the laminations and attach them to the frame rings. The term "keybar" used herein refers to both round bolts and keybars; they pass through open slots in the outer periphery of laminations. Throughbolts on the other hand refer to long round bolts inserted via through holes inside laminations, and are used to apply additional compression. Irrespective of the size or shape of clamping bolts, their outer surface (termed "keybar-contact") makes an electrical contact with laminations and other attached parts such as flanges and frame rings. This keybar-contact acts as a conduit for transmitting hazardous eddy currents produced by the machine. In prior art, keybar contact has practically zero-resistance; no attempt is made to increase its surface resistance. Such prior-art keybar that makes zero resistance contact with other parts is termed "uncoated keybar" herein. Such uncoated keybar does not have surface modifiers or coatings on its surface that can alter its surface resistance.

Figure 1A:
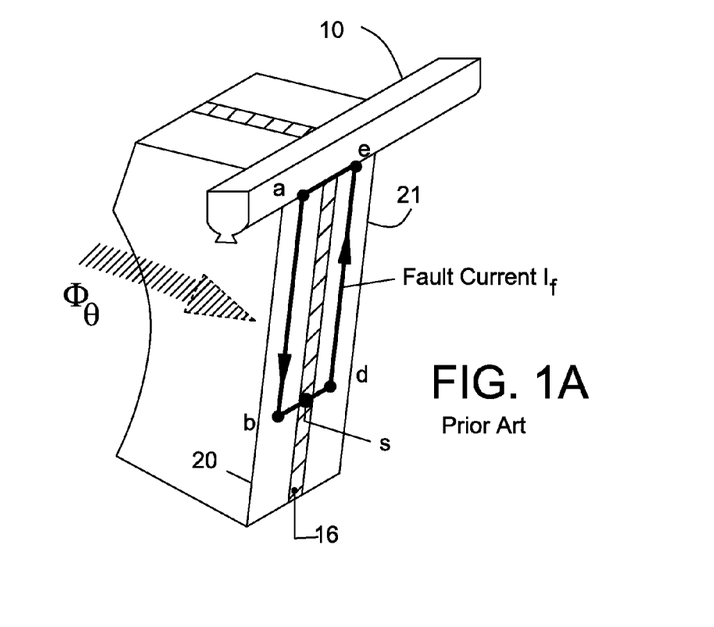

FIG. 1A shows two laminations 20, 21 joined by coated area 16 suspended by an uncoated keybar 10. The two laminations 20, 21 are shorted at point s in the insulative coating 16. Shorts can occur due to burrs on edges, defects in the insulated surface or interlaminar microwelds at high points of contact. FIG. 1A also depicts an uncoated keybar 10 making electrical contacts at a and e with laminations 20, 21. The uncoated keybar 10 aids circulation of destructive Fault Currents as follows. The alternating main flux $\phi_\theta$ induces a small eddy voltage $V_\theta = d\phi_\theta/dt$ in the laminations. This causes Fault Current $I_f$ to flow through laminations 20, 21 along the loop absde in the direction indicated by the arrows. In the lamination 20 containing leg ab, it flows radially inward from the keybar-contact a for a distance equivalent to the length of the shorted span. In the shorted segment bsd, it flows axially through the short s. In the lamination 21 containing leg de, it flows radially outward until it reaches the keybar-contact e. In the uncoated keybar 10 containing the leg ea, the fault current flows from key-bar contact e to the keybar-contact a. The uncoated keybar shorts with laminations at a and e enabling closure of the Fault Current loop. The electrical resistance to eddy current flow is low, leading to large fault currents. Large currents through a small area at s cause high heat load resulting in hot spots. If several hot spots are concentrated in a localized area, they can interconnect and grow, causing a core failure. Thus in prior art, excessive Fault Currents, aided by the uncoated keybar, can lead to hot spots and core failure as discussed in U.S. Pat. Nos. 8,289,031, 8,179,028, 4,494,030; 4,573,012; 4,996,486 and 6,791,351, Edmonds 2007.

Figure 1B:
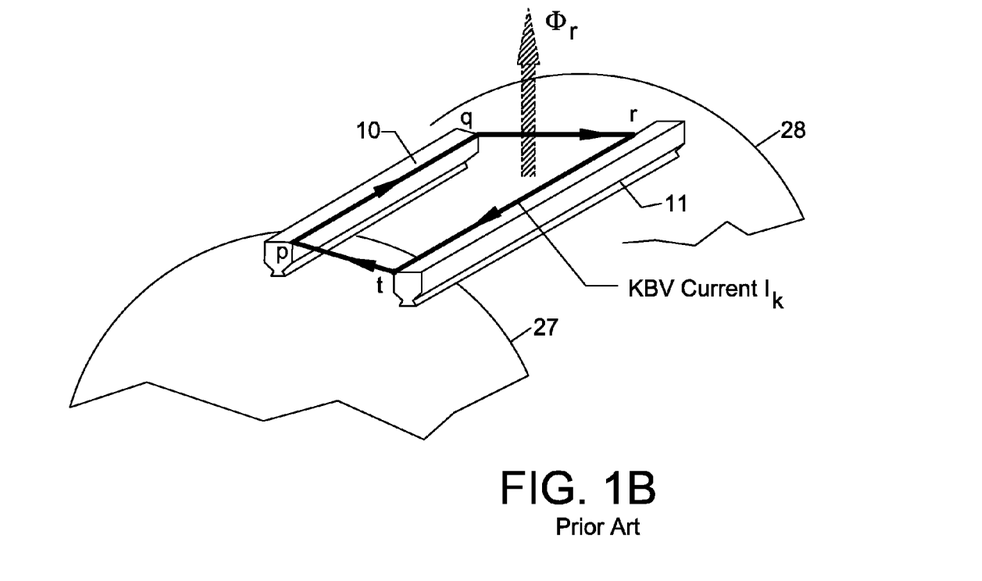

FIG. 1B describes how prior-art produces destructive Keybar Currents, aided by the uncoated keybars. It depicts a typical "keybar grid" at the core-end, comprising two adjacent keybars 10, 11 plus electrically connected flange or frame ring 27 and an adjacent frame ring 28. At contacts p, t the uncoated keybar is electrically shorted to the flange 27 while at the contacts q, r it is electrically shorted to frame ring 28. When the machine is overfluxed (viz., operated at unloaded open circuit condition, loaded leading power factor condition, short-circuit condition etc.) the core-end laminations are nearly saturated as they are trying to carry too much flux—normal main flux, fringe flux, plus abnormal overflux. As a result, some flux leaks into the air surrounding the outer core periphery. This leakage flux has a rotating radial component $\phi_r$, which induces current in several electrical paths. FIG. 1B shows a particular path through the keybar grid. The rotating flux $\phi_r$ cuts two successive keybars 10, 11 so induces a small voltage $V_k$ in them. This drives Keybar Current $I_k$, which circulates along pqrt path in the direction indicated by arrows. In the uncoated keybar 10, it flows axially from keybar-contact p to keybar-contact q. In the frame ring 28, it flows peripherally from keybar-contact q to keybar-contact r. In the uncoated keybar 11, it flows axially from keybar-contact r to keybar-contact t. In the flange (or frame ring) 27, it flows peripherally from keybar-contact t to keybar-contact p closing the loop. If there are axial or peripheral shorts between laminations, some of the Keybar Current can also flow through the laminations and damage them. Prior art suffers from such destructive Keybar Currents aided by uncoated keybars as discussed in several patents, viz. U.S. Pat. Nos. 3,652,889; 6,429,567; 6,713,930 and 6,720,699.

In a similar fashion, hazardous throughbolt currents can circulate in machines employing uncoated throughbolts. A typical "throughbolt grid" comprises two adjacent uncoated throughbolts attached to flanges on both ends. The uncoated throughbolt contacts both flanges as well as laminations. The flux hitting the uncoated throughbolts has a rotating radial component that induces a small voltage in the throughbolts. This results in throughbolt current $I_t$ that circulates in all the throughbolt grid parts. In the uncoated throughbolts, this current flows axially from a first flange end to the second flange end. In the flanges, it flows peripherally from one throughbolt to adjacent throughbolt via the throughbolt contacts. If there are shorts within the core, some of the throughbolt current can also flow through the laminations damaging them. It is apparent that in prior-art, an uncoated throughbolt detrimentally facilitate flow of destructive throughbolt currents.

Thus, the uncoated keybars or throughbolts used by prior-art has several damaging consequences. First, they support circulation of perilous Fault Currents $I_f$, Keybar Currents $I_k$ and throughbolt Currents $I_t$. Excessive fault currents can cause hot spots. Excessive hot spots concentrated in a small area can result in core failure. To avoid core failure, one might be forced to derate the machine. Excessive fault currents can also repel the main flux, thereby reducing the power output. They can also increase core losses or reduce efficiency. Excessive keybar currents can cause core-end heating or core decompression and subsequent loose laminations. The keybar current is significantly larger than the fault current. Large keybar currents crowding over the outer surface (up to its skin depth) can overheat the keybars, flanges, frame rings etc. An overheated keybar could expand, causing the core to decompress, resulting in loose laminations. Expanding keybars could also cause thermal stresses in the frame rings. Thus, large keybar currents can damage a machine that contains fully insulated laminations that have no shorts. They also limit the leading power factor regime or cause derating of the machine. Some keybar current can also leak via laminations and damage them also. To prevent all such severe damages, there is a need to reduce all—fault current, keybar current and throughbolt current simultaneously. Prior art employed several methods to limit damages: these include recoating, fault detection, flux shielding, insulating the keybar etc.

First, the recoat method involves burr-grinding laminations followed by a relatively a thick recoat per Coombs 2001. A recoat is believed to further reduce the risk of short-circuits arising from burrs. However, recoating requires installation of a recoating plant and maintaining strict control for optimal hardness of the recoat. Since a recoating plant requires large capital investment and its operation demands expensive quality control, the recoat method increases the overall cost of the machine.

Second, the core fault detection methods have been ubiquitously employed to detect core faults. These include a high-powered Ring Flux test and low powered EL-CID test EL-CID that stands for "Electromagnetic Core Imperfection Detector" (EL-CID) as disclosed in UK Patent 2,044,936. Both try to locate the core sections containing the shorts or faults. Once a fault area is identified, the technicians attempt to replace or repair the shorted laminations. However, these devices are expensive and require skilled and experienced operators. Even then, the results can sometimes be misleading. In fact, a 2004 EPRI publication 1009855 entitled "Generator core overheating risk assessment" reports on p. 5-2 that ELCID could lead to attempting to repair defects that are not there; they further state that there did not appear to be a correlation between the intended severity of the defects and the current flow measured by EL-CID. Such documented remarks cast doubts on the effectiveness of some core fault-detection devices.

Third, the insulated keybar method uses an insulated keybar to eliminate Fault Current. This insulation is provided either by a loose insulative sleeve over an uncoated keybar as in U.S. Pat. No. 4,494,030, or an insulative strip wedged into dovetail slot as in U.S. Pat. No. 7,202,587 or a heat shrinkable tubing wrap over an uncoated throughbolt as in U.S. Pat. No. 6,949,858. Such insulation electrically cuts off the keybar contact in the Fault Current path so zeroes the Fault Current. To avoid ground fault risk, the keybar-contact should be non-insulative. The keybar-contact is required to electrically connect the stator core to the frame in order to close the ground current loop. An insulated keybar breaks this grounding loop and subjects the machine to ground fault risks.

Fourth, the flux shield method uses a conductive shield, shunt etc to reduce the Keybar Current. Conductive straps attached to the dovetail slot that short with keybar were proposed in U.S. Pat. Nos. 6,462,457 and 6,720,699. Conductive wires connecting all these straps were also proposed in U.S. Pat. No. 6,429,567 to shunt the Keybar Current. A leaf spring to short keybar and laminations was proposed in U.S. Pat. No. 6,548,928. Adjusting the number of keybars, position of keybar relative to phase belt etc was proposed in U.S. Pat. No. 7,113,899. All these means however short the keybar with laminations. However, a shorted keybar closes the path for the destructive fault current and excessive fault currents unfortunately can destroy the core.

Thus, all these prior-art methods to reduce the Fault Current or Keybar Current suffer from serious drawbacks. The recoat method requires large capital and expensive quality control. The core-fault detection method requires significant expertise, expensive equipment and can be misleading. The insulated keybar method fails to ground the core. The flux shield method increases core failure risk. Thus none of the prior art method can protect all components of the stator or prevent core-end heating. In contrast, this disclosure presents a method that simultaneously reduces the Fault Current, Keybar Current and Throughbolt current, thereby preventing core-faults and core-end heating. It also prevents core failure or derating of the machine. It also eliminates the need for core-fault detection tests or recoating the laminations. It also prevents decompression of the core and consequent loosening of laminations.

SUMMARY OF THE INVENTION

A major object of the present invention is to protect the machine against damage caused by fault currents, keybar currents and throughbolt currents. Another object is to prevent hot spots in the core. Another object is to prevent core failure. Another object is to prevent derating of the machine caused by harmful eddy currents circulating within the core. Another object is to eliminate the need for core-fault detection equipment. Another object is to eliminate the need for recoating the laminations. Another object is to prevent core-end overheating during over-fluxing. Another object to protect the machine at higher leading power factor operating condition. Another object is to protect the machine under severe open circuit conditions. Another object is to protect the machine under severe short-circuit conditions. Another object is to reduce eddy currents from flowing through keybars. Another object is to eliminate devices to limit the Keybar Current. Another object is to prevent core decompression. Another object is to prevent loose laminations. Another object is to increase the efficiency. Another object is to reduce core losses. These objects and other benefits will be apparent to a person skilled in the art on perusal of the disclosed invention.

To meet these objectives, this invention inserts a resistive element into the electrical circuit of eddy currents to weaken them. The inserted element is in the form of a high-resistive layer engaged to the surface of prior art uncoated keybar. The layer can be a coating or plating integral to the uncoated keybar, or a strip wedged between the uncoated keybar and connected parts. The term "plating" used herein refers to a coating comprising conductive or semiconductive materials. The surface resistance of the layer can range 25 to 250 $\Omega cm^2$. Its thickness can range 0.001" to 0.03". Its volume resistivity can range 1 to 1000 $\Omega m$.

One embodiment of the invention is a high-resistivity coating over the surface of an uncoated keybar. The dovetail portion of the coated keybar fits snugly inside a matching dovetail slot of laminations over the plated surface. The bolt portion of the coated keybar is welded to frame rings over the coated surface. The coating forces the fault current or keybar current to pass through the high resistivity coating layer. The high resistance of the coating inserted into the electrical circuits substantially weakens them, thereby suppressing the core failure or core end heating. Optionally the coating can be applied with gaps matching the ventilation gaps in the core. This prevents potential delamination of the coating. In a similar fashion one can apply a high-resistivity coating over a prior-art uncoated throughbolt. This forces the eddy currents induced in the though-bolt to pass through the coating, whose high resistivity suppresses the eddy currents.

A preferred high resistivity coating employs electro-deposition technique using a high-resistivity material such as silicon carbide, applied with or without a conductive or insulative binding matrix. A typical plating employs Nickel as a glue that binds Silicon Carbide particles, both electro-deposited on the steel surface of the keybar. The plating process employs the keybar and a parallel nickel bar, both immersed in an electrolytic tank containing SiC particles in a stirred electrolytic medium. A voltage applied to the keybar and nickel bar generates current, which deposits nickel and silicon carbide particles on the surface of the keybar. Such SiC-nickel plating is weldable, has high bond strength, high wear resistance and high compressive strength. Therefore, it is appropriate as a high-resistivity coating on an uncoated keybar. The resistivity of this coating is controlled by the loading of the SiC particles and the speed. Alternative plating, offering 100 $\Omega$m resistivity, comprising tin oxide matrix doped with aluminum particles, is disclosed in U.S. Pat. No. 4,948,549. Resistivity ranging $10^{-3}$ to $10^8$ $\Omega$m can be obtained by sputtering tin oxide with embedded magnesium fluoride particles per NASA Doc. No. 20070024816. Reactive sputtering was also employed to develop high-resistivity plating as disclosed in U.S. Pat. No. 4,988,422. Another embodiment employs a layer comprising a high-resistivity strip that is wedged in the gap between the keybar and attached components.

BRIEF DESCRIPTION OF THE DRAWINGS

For a better understanding of the nature and objects of the present invention, reference may be made to the accompanying schematic drawings.

FIG. 1 indicate the prior-art, with FIG. 1A showing a perspective view of an uncoated keybar closing the Fault Current loop, FIG. 1B showing two uncoated keybars closing the Keybar Current loop.

FIG. 2 display respective circuit models, with FIG. 2A showing the circuit model for Fault Current and FIG. 2B showing the circuit model for the Keybar Current.

FIG. 3 display the reduction of these currents as a function of resistivity of keybar coating, with FIG. 3A showing the reduction in Fault Current and FIG. 3B showing the reduction Keybar Current.

FIG. 4 display the coated keybar embodiment of the invention, with FIG. 4A showing the cross section of the coated keybar, FIG. 4B showing the coated keybar attached to the laminations and a frame ring, FIG. 4C showing the skin depth of the coated keybar through which Keybar Current flows and FIG. 4D showing the longitudinal section of the coated keybar and the attached lamination packs.

DETAILED DESCRIPTION OF THE INVENTION

In prior-art, when two or more consecutive laminations are shorted, the net resistance against flow of Fault Current is low. This low resistance causes unacceptably large Fault Current even when the drive voltage is low. Such large Fault Currents can cause core failure. In this disclosure, a high-resistive element is inserted into the electrical circuit of the Fault Current to weaken them and prevent core failure.

Figures 2A, 2B:
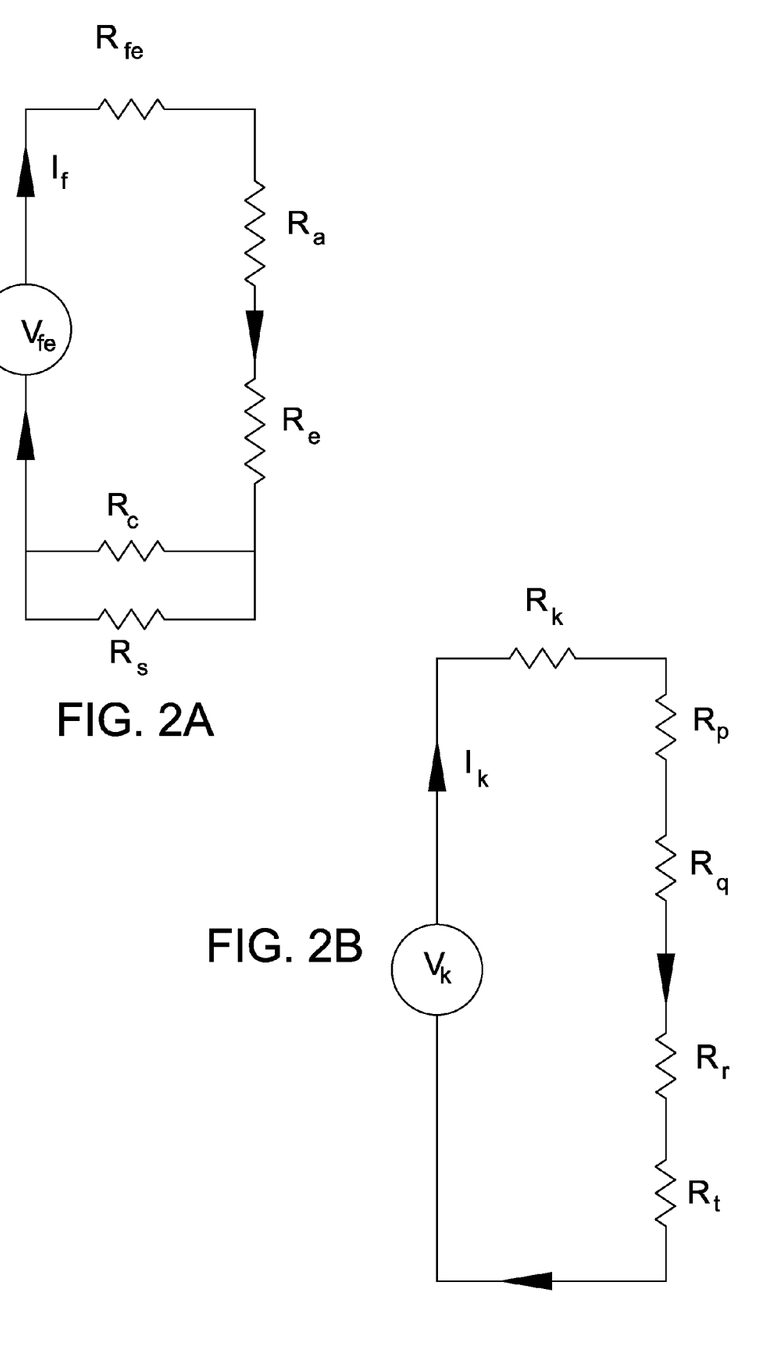

FIG. 2A displays a discrete circuit model for Fault Current $I_f$ flowing between two faulty laminations shown in FIG. 1A. This Fault Current is determined by the eddy voltage through iron laminations $V_{fe}=d\phi_e/dt$ and the net resistance R of the circuit. It flows through the iron laminations 20, 21, keybar-contacts a, e and the lamination coating 16. The circuit comprises a resistor $R_{fe}$ representing the iron path ab+de plus resistors $R_a$, $R_e$ representing keybar-contacts a, e. (In prior art, the contact resistances $R_a$, $R_e$ of an uncoated keybar is nearly zero and ignorable). It models the coating as a resistor $R_c$ representing resistance of lamination coating in parallel with a resistor $R_s$ representing that of the short s. The short resistance $R_s$ is nearly zero and negligible. The iron resistance $R_{fe}$ is also extremely small. The resistance of the lamination coating resistance $R_c$ on the other hand is relatively high.

A thin coating 16 insulate the laminations with resistance $R_c$. The resistivity $\rho_c$ of this coating ranges 25 to 3000 $\Omega$m depending on the lamination supplier and materials used to build the coating. Since this resistivity is mid-way between that of conductive materials (~$10^{-8}$ $\Omega$m) and insulative materials (~$10^{12}$ $\Omega$m), the coating is sometimes termed "semiconductive". The terms semiconductive and high-resistive are used synonymously herein. The corresponding surface resistance generally ranges 5 to 200 $\Omega$cm$^2$ depending on coating thickness (ranging 0.5 to 9 $\mu$m), compression pressure (ranging 10 to 800 psi) and annealing condition.

It is well known that the lamination coating's primary function is to limit interlaminar eddy currents. But an often under-emphasized, but equally important function of the coating is to thwart the damage that can be caused by hot spots (e.g., core failure) caused by interlaminar shorts, as discussed in Coombs 2001. That the lamination coating should share some responsibility in preventing hot spots is clear from the following analysis. When the coating does not have a short, all the interlaminar current flows through the coating resistance $R_c$. The high resistivity of the coating then produces relatively low interlaminar eddy current. A coating whose resistivity (e.g., $10^{-2}$ $\Omega$m) is three to four orders of magnitude higher than that of iron (~$10^{-6}$ $\Omega$m) is theoretically sufficient to diminish or annihilate interlaminar currents. The diminished currents are spread uniformly over the entire insulated surface of the lamination so it results in uniform distribution of heat. A lamination with uniform heat load does not develop hot spots so does not cause core failure.

All cores invariably suffer from electrical shorts due to burrs or defects and they cannot be fully eliminated. When a lamination coating has a short at point s, the interlaminar Fault Current goes through the least resistance path, viz. via the short resistance $R_s$, bypassing the coating resistance $R_c$. In this case, the net resistance R of the circuit is the sum of the short resistance $R_s$, iron resistance $R_{fe}$ and the keybar contact resistances $R_a$, $R_e$. Since the prior art employs uncoated keybars, the keybar contact resistance $R_a$, $R_e$ is zero, so the net path resistance R equals the iron resistance $R_{fe}$. Since iron resistance $R_{fe}$ is very low, in prior art, a short s produces substantially large Fault Current $I_{fo}=V_{fe}/R_{fe}$. This large current passing through a minute short causes hot spots at the point s of electrical short. Multiple hot spots can cause core-failure. Even a fully insulative coating (e.g., $10^{12}$ $\Omega$m) is ineffective in preventing hot spots. Therefore, a recoat is often applied over a mill-coat to reduce the number of hot spots, but it increases the cost of the machine.

In this invention, the keybar-contact resistances $R_a$, $R_e$ are deliberately set to be ~100 to 1000 times that of the iron resistance $R_{fe}$. This is accomplished by applying a high-resistivity coating over an uncoated keybar. For example, a high-resistivity keybar coating with net resistance $R_a+R_e$ that is ~1000 times the iron resistance $R_{fe}$ reduces the Fault Current $I_f$ by a factor of 1000. Thus even if the insulation is shorted, a coated keybar whose resistance is substantially higher than iron path resistance produces substantially lower Fault Current $I_f$. As a result, with a coated keybar, the core does not create hotspots even when laminations are shorted. Absence of hot spots fails to trigger a core failure.

FIG. 2B displays a discrete circuit model for Keybar Current $I_k$ flowing between adjacent keybars that are shown in FIG. 1B. This current is determined by the overfluxing voltage $V_k$ and the net resistance R of the path. The net resistance R is sum of the resistance $R_k$ of the keybar path pqrt and the resistances $R_p$, $R_q$, $R_r$, $R_t$ of the keybar-contacts p, q, r, t with the flange and frame rings. In prior art, the keybar contacts p, q, r, t short the keybars with flange and frame ring, and have negligible resistance. So the net resistance R equals the resistance $R_k$ of the keybar path pqrt. Since this keybar path resistance $R_k$ is very low, substantially large Keybar Current $I_{ko}$ flows through keybars. Large keybar currents could lead to core-end overheating and cause other damages that can greatly harm the machine. In the present invention, the net key-bar contact resistance $R_p+R_q+R_r+R_t$ is deliberately set to be 100 to 1000 times that of keybar path resistance $R_k$. This reduces the Keybar Current $I_k$ by a factor of 100 to 1000 from that of prior-art Keybar Current $I_{ko}$. Such minute Keybar Currents greatly reduce the risk of damage to the machine. In summary, the disclosed invention employs a coated keybar to reduce not only Fault Current but also Keybar Current.

Figure 3A:
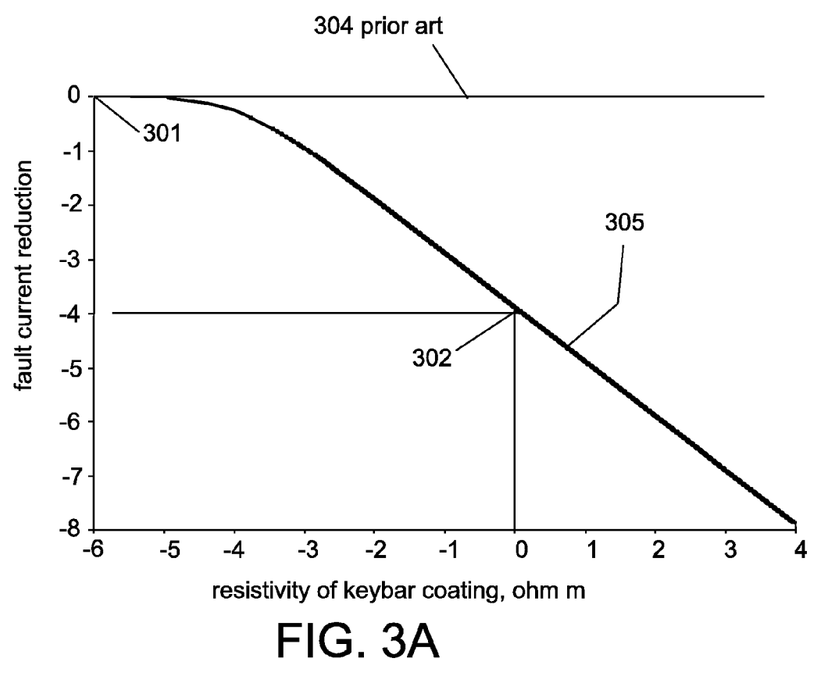

The intensity of reduction of these harmful currents depends on the resistivity of the keybar coating and its thickness. FIG. 3A shows the effect of keybar-contact resistivity on Fault Current. The x-axis refers to the keybar coating's resistivity $\rho_k$, with its scale displaying the exponent only, e.g. −6 refers to $10^{-6}$ Ωm. The y-axis refers to Fault Current Reduction, which is defined as the Fault Current in a coated keybar divided by that in an uncoated keybar. Its scale also shows only the exponent, e.g., −4 refers to Fault Current Reduction ratio of $10^{-4}$. The Fault Current produced by the prior art uncoated keybar depends on the main flux density, size of the laminations and number of shorted laminations. For example, when two 0.014" thick silicon steel laminations ($0.5×10^{-6}$ Ωm resistivity) with 10" radial×10" peripheral yoke carrying 1.6 tesla at 60 Hz are shorted at the slot bottom, the Fault Current produced by the prior-art is about 40 A. (A short between three laminations increases this to about 88 A and is unacceptable.) The line 304 refers to the uncoated keybar used in the prior art, and shows no reduction in fault current (Fault Current reduction=1). In contrast, curve 305 plots Fault Current reduction in an example coated keybar with a coating thickness of 25 μm. The point 301 shows that, when the keybar-contact shorts with lamination ($\rho_k=10^{-6}$ Ωm) the Fault Current equals that produced by prior art. Point 302 shows that, as the keybar-contact resistivity increases to 1 Ωm, the Fault Current Reduction is $10^{-4}$. That is, a coated keybar reduces the Fault Current by four orders of magnitude. Even though this figure illustrates Fault Current reduction when a defect shorts only two laminations, it is equally effective for defects that short three or more laminations. This figure appears to suggest that a keybar coating with resistivity of at least 1 Ωm is necessary to suppress fault currents, but further analysis below shows a coating with higher resistivity is needed to suppress keybar currents also.

Figure 3B:
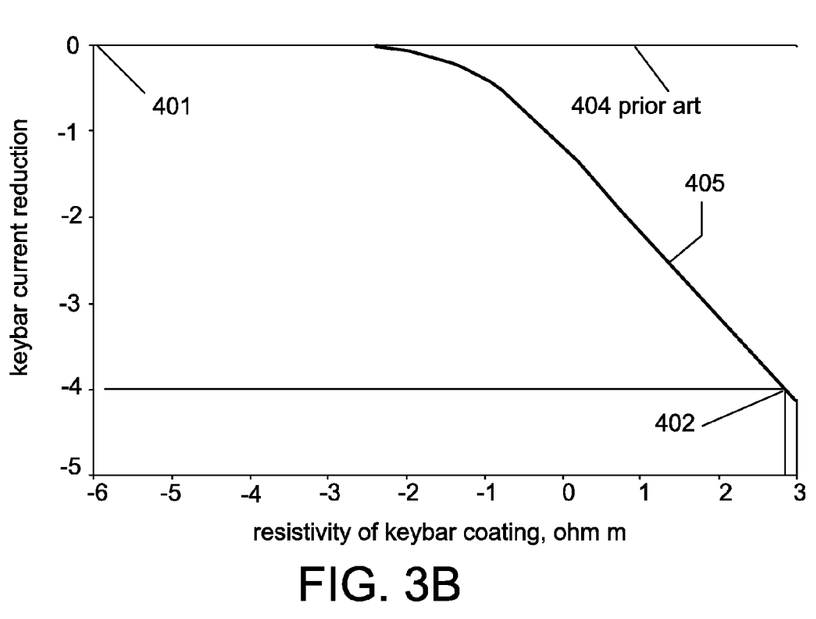

FIG. 3B shows how the keybar coating resistivity reduces the Keybar Current. The x-axis refers to keybar coating resistivity $\rho_k$, with its scale displaying the exponent only, e.g. −6 refers to $10^{-6}$ Ωm. The y-axis refers to Keybar Current reduction, which is defined as the Keybar Current flowing in a coated keybar divided by that flowing in an uncoated keybar. The scale for the y-axis also shows only the exponent, e.g., −4 refer to Keybar Current reduction of $10^{-4}$. The strength of Keybar Current produced by prior art depends on radial component of the leakage flux density at the back of the core. For example, when 0.005 Tesla radial leakage flux sweeps a 12"×12" steel (0.03" skin depth) keybar frame at 60 Hz, the current in an uncoated keybar is ~100 A. The line 404 refers to current reduction by prior art Keybar (=1). Curve 405 plots the Keybar Current reduction in an coated keybar with say a 25 μm thick coating. The point 401 shows that an uncoated keybar ($\rho_k=10^{-6}$ Ωm) shorts with frame ring and flange, so no reduction occurs in the Keybar Current. Point 402 shows that, as this resistivity increases to ~1000 Ωm, the Keybar Current reduces by four orders of magnitude. Thus, this curve shows that, to reduce keybar current with a high degree of confidence, a keybar-contact resistivity of at least 1000 Ωm is needed. Considering 1 Ωm is needed to suppress fault current and 1000 Ωm is needed to suppress keybar currents, an acceptable keybar coating resistivity ranges 1 to 1000 Ωm. This corresponds to a keybar coating's surface resistance ranging 25 to 250 Ωcm². This range of surface resistance range can weaken both Fault Currents and Keybar Currents satisfactorily. Such coating on keybar can thus not only prevent hot spots and core failure, but also reduce core-end overheating; it also enables one to ground the core, so prevents ground faults.

The high-resistivity layer over keybar can be implemented as a coating over the keybar surface or a strip wedged between the keybar and attached components. The coating can be a high resistivity plating, coating or a tape. The coating can be applied over the entire periphery of the keybar or at selected areas. The high resistivity strip can be a rigid or compressible, and may or may not employ wedges for firmly attaching the keybar with other components.

Figure 4A:
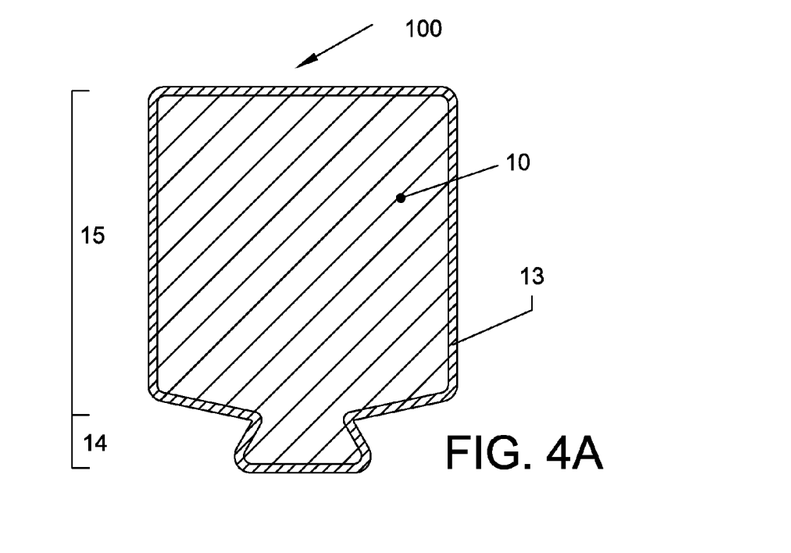

FIG. 4A shows the cross-section of a coated keybar embodiment 100. This coated keybar 100 is built by applying a high-resistivity coating 13 over the surface of a conventional keybar 10. The coating's surface resistance ranges 25 to 250 Ωcm². Its thickness ranges 0.001" to 0.030". Its resistivity ranges 1 to 1000 Ωm. A thinner coating will have higher resistivity and thicker coating will have lower resistivity. The exposed surface of the keybar 100 has substantially higher resistance than the underlying keybar 10. The coated keybar 100 is subdivided into a coated dovetail 14 and a coated bolt 15 as shown.

Figure 4B:
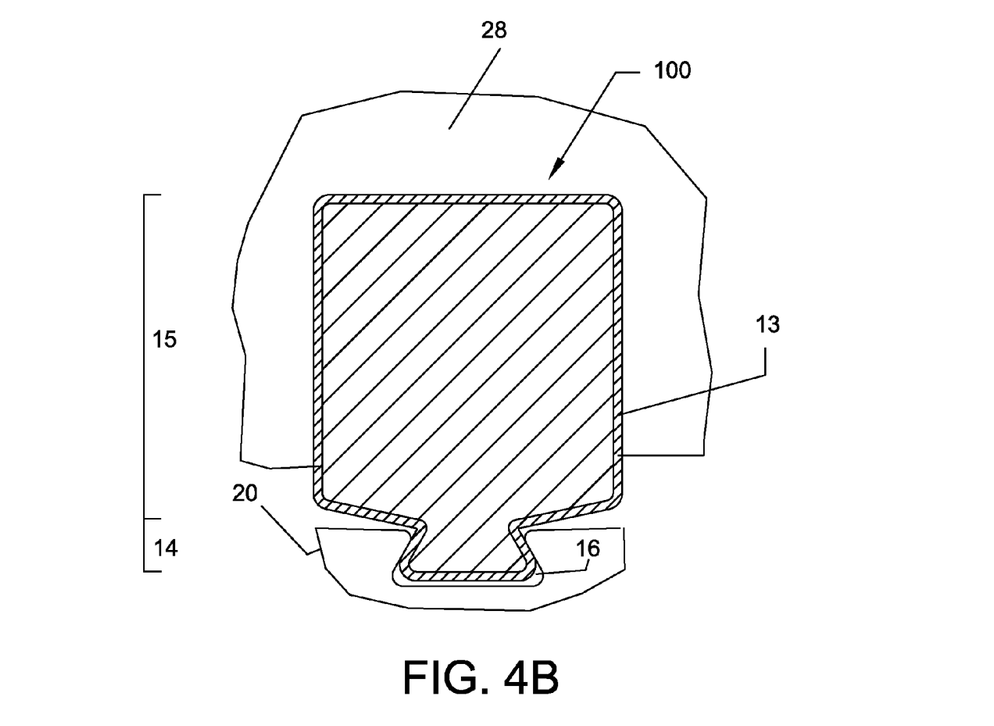

FIG. 4B shows how the coated keybar 100 attaches to the laminations and the frame ring or flange. The coated dovetail 14 attaches to the laminations 20 while the coated bolt 15 attaches to other components such as flange or frame rings. The coated dovetail 14 fits snugly inside a matching dovetail slot 16 in the lamination 20. The high-resistivity slanted faces of the coated dovetail 14 are in electrical and mechanical contact with respective slanted faces of the dovetail slot 16. FIG. 4B also shows how the coated bolt 15 attaches to the frame ring 28. The coated bolt 15 passes through a matching hole in the frame ring 28. Both the flange and the keybar 100 are welded at the surface of the coated bolt 15. In both coated dovetail and coated bolt, the electrical communication occurs via the high-resistivity coating 13. The Fault Current and Keybar Current thus must pass through the coating 13. Introduction of a high-resistivity element 13 in the respective circuits in this fashion substantially reduces these currents. The weakened Keybar Current and Fault Current effectively block prevent hot spots and consequent core failure, core end overheating, core decompression or loose laminations.

Figure 4C:
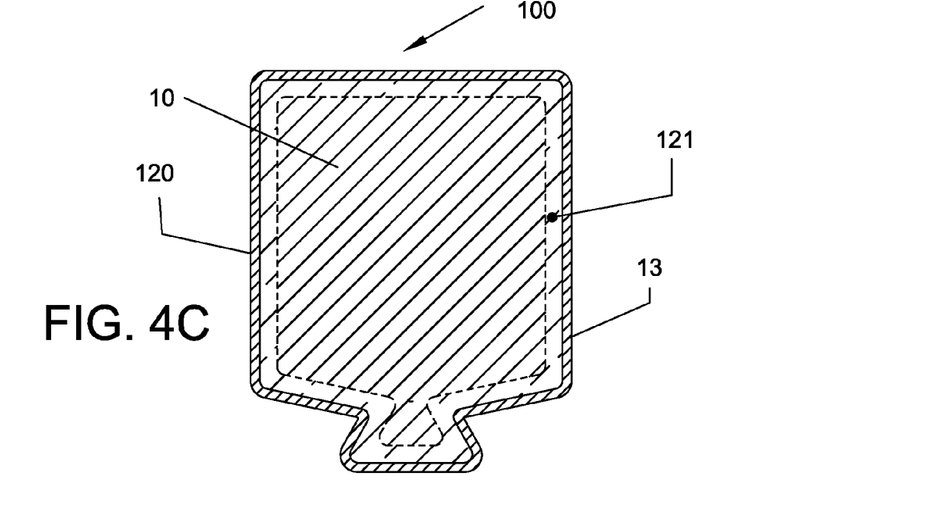

FIG. 4C shows the skin 121 of the coated keybar 100 through which the Keybar Current flows. It is located at the outer surface of the coated keybar 100, just below the high-resistivity coating 13. The thickness of the skin (skin depth)

depends on the ratio of resistivity and permeability of the keybar. Prior art keybar 10 is typically made of high strength steel. It relative permeability is ~1600 and resistivity is ~0.17×10$^{-6}$ Ωm. The skin depth of such keybar when carrying 60 Hz currents at 120 C is 0.030". Such thin skin greatly increases the current density of keybar currents and causes its overheating.

In a prior art uncoated keybar 10, flow of large Keybar Currents through thin skin 121 substantially increases the current density. The resulting excessive heat elevates the temperature of the keybar 10 whose thermal expansion pushes the flanges out, causing a reduction in the clamping pressure. Such core-decompression causes laminations to become loose and rattle. In the coated keybar 100, the high-resistivity coating 13 weakens the Keybar Currents Such weak Keybar Currents cannot overheat the keybar and do not cause core decompression, thereby preventing core-end heating, core-decompression or loose laminations.

Figure 4D:
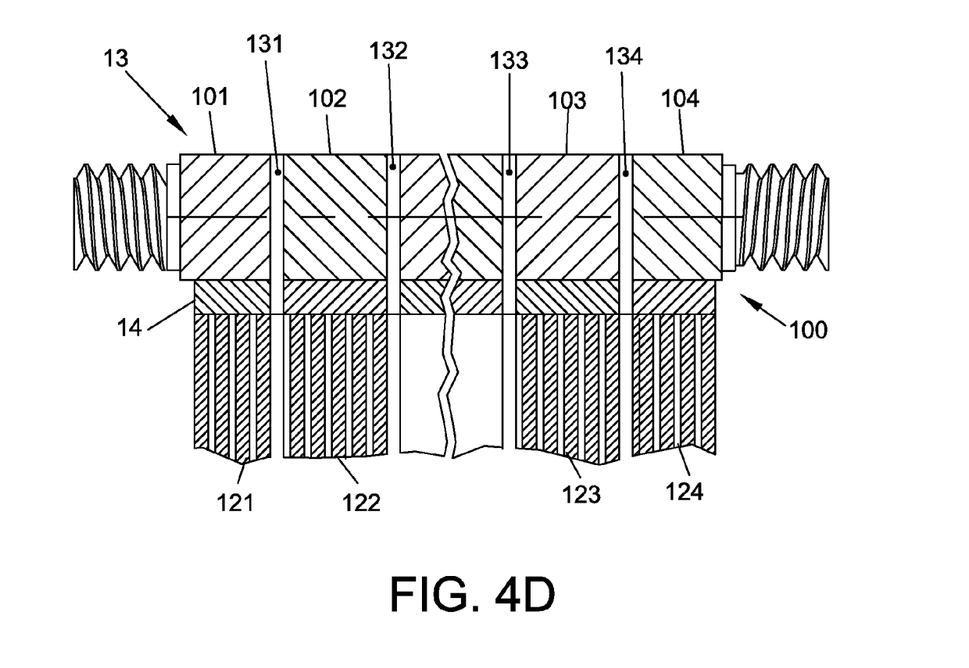

FIG. 4D shows gapping of the coating 13 to prevent its delamination. It shows the coated keybar 100 suspending a set of lamination packets 121, 122, 123, 124 separated by venting gaps 131, 132, 133, 134. The keybar 100 is coated only in the spaced segments 101, 102, 103, 104 shown. The axial length of these segments is synchronized with the lamination packets 121, 122, 123, 124. There is no coating in the ventilation gaps 131, 132, 133, 134 as shown. Such construction allows the coating to contact the laminations where it is needed. The axial length of each coated segment 101, 102, 103, 104 is much smaller than the total length of the keybar. Breaking a long surface into smaller segments 101, 102, . . . in this manner reduces the thermal expansion of the coating relative to the keybar. The method isolates any delaminated segment and protects total delamination of the coating.

Figure 5:
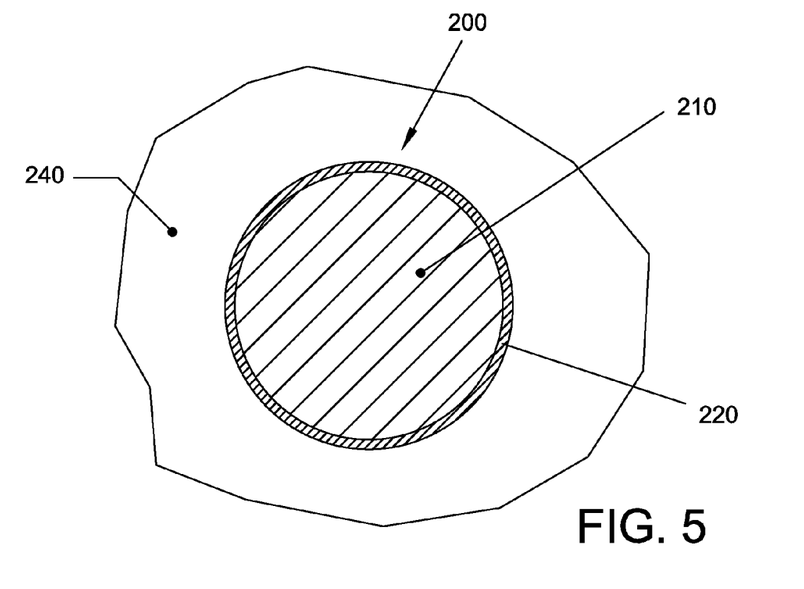
FIG. 5 displays the coated throughbolt embodiment of the invention showing the plating over a conventional keybar and inserted into a hole in laminations.

FIG. 5 shows a coated throughbolt embodiment 200 in accordance with the present invention. This coated throughbolt 200 comprises a conventional throughbolt with a high-resistivity coating 220. The exposed surface of the coated throughbolt 200 has substantially higher resistivity than the underlying throughbolt 210. The coated throughbolt 200 is inserted through an identical hole in the laminations and flanges 240 as shown. The surface of the high-resistivity coating 220 is in electrical contact with the flanges and laminations. The eddy currents generated in the throughbolt must pass through this high-resistivity coating 220 which weakens them. The weakened throughbolt currents reduce their operating temperature, hence prevent core-decompression and subsequent loosening of laminations.

The high resistivity coating can be applied over a conventional uncoated keybar 10 by electro-deposition technique. Such plating can employ a standalone high resistivity material or combine them with a binding matrix material. Different materials for the matrix and resistivity can be used. A preferred one is the Nickel-SiC plating. In this, Nickel is used as a glue that holds and supports the silicon carbide particles on the surface of an uncoated keybar. The SiC particles are populated within the Nickel matrix. A conventional uncoated keybar and a nickel bar are dipped in a plating tank containing electrolyte and SiC particles. The electrolyte is continuously agitated. A voltage passes current from the uncoated keybar to the nickel bar through the electrolyte and deposits nickel and silicon carbide particles on the surface of the uncoated keybar. Typical thickness of the plating ranges 0.002" to 0.020". Thicker plating can be developed for superior wear or higher surface resistance. The resistivity of the plating is controlled by varying the loading of SiC particles. The expansion coefficient of Ni—SiC plating matches that of keybar steel so it produces smallest possible thermal stresses. Silicon Carbide has high pencil hardness and scratch resistance, high wear resistance and has high strength, so can meet typical requirements common in large machines. Both nickel and SiC can withstand high temperatures produced during adverse operating conditions. The Ni—SiC plating has high wear resistance, good weldability, high compressive strength and high shear strength and meets most requirements for transmitting torque in vibratory environment. Such Ni—SiC plating is widely used in auto industry to produce high wear-resistant liners for engine cylinders in race cars. Several firms such as such as Millennium Technologies, Plymouth, Wis. produce Ni—SiC plating. Such commercial plating process can be tweaked to achieve the desired high resistivity by changing the loading of SiC particles. Alternative plating, offering 100 Ωm resistivity, comprising tin oxide matrix doped with aluminum particles, is disclosed in U.S. Pat. No. 4,948,549. Alternative ferrite and powder cores can achieve the desired resistivity range, but they are not strong enough for use over the keybar.

The high resistivity coating can also be made by embedding resistive filler in an insulative resins. Semiconductive coatings that are developed to insulate the electrical laminations could be employed effectively to coat the keybar, but they are very thin and may wear out. High-resistivity coating with resistivity ranging $10^2$ to $10^5$ Ωm, comprising graphitic particles dispersed in a polymeric resin matrix are disclosed in U.S. Pat. No. 3,686,139 and are widely employed for corona protection in stator bars. Alternative coating with resistivity ranging $10^7$ to $10^9$ Ωm, comprising SiC particles dispersed in a resin as disclosed in U.S. Pat. No. 3,210,461 is widely used for stress grading. Alternative coating with resistivity ranging $10^5$ to $10^{10}$ Ωm comprising carbon nanotube particles in polymeric resin is disclosed in U.S. Pat. Pub. No. 2009/0162777. However, the wear resistance of insulative resin based coatings is generally inferior to that of non-resin based plating. Further, it is very difficult to weld over the resin-based coating without destroying the coating, so they are not well suited for use over keybar.

Other techniques for producing keybar coating include thin film deposition, vapor deposition, ion vapor deposition, reactive sputtering, resin coating, thermal spray, brazing, etc. Choice of a technique depends on compatibility to welding and how the thickness and resistivity capability of a process matches with the requirements of a high-resistivity coating. Typical vapor deposition and sputtering techniques offer low thickness or resistivity that may or may not meet the high-surface resistance requirements of a coated keybar. Reactive sputtering has been used to obtain satisfactory resistivity. For example, resistivity ranging $10^{-3}$ to $10^8$ Ωm can be obtained by sputtering tin oxide with embedded magnesium fluoride particles per NASA Doc. No. 20070024816. Reactive sputtering was also employed to develop high-resistivity plating as discussed in U.S. Pat. No. 4,988,422.

Figure 6:
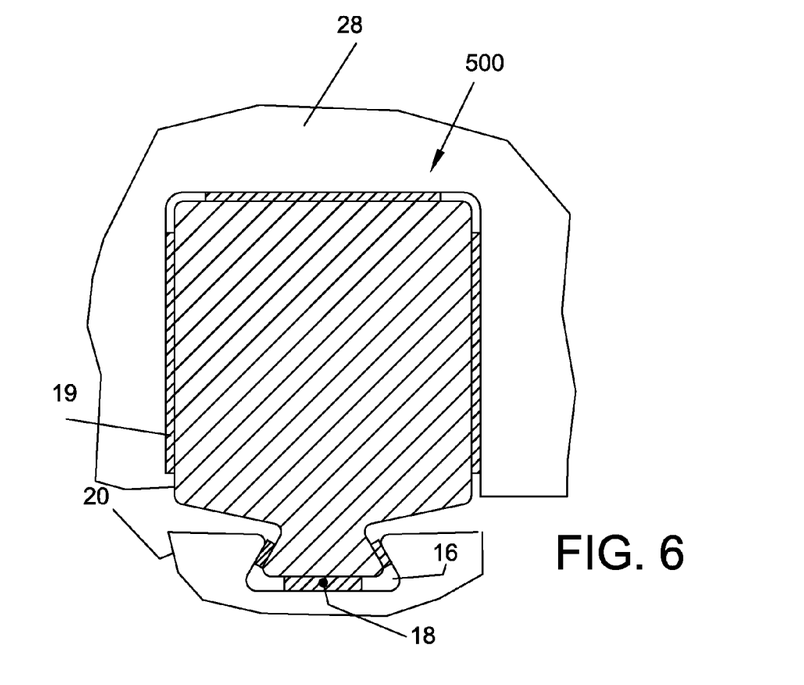
FIG. 6 shows an alternative embodiment of the high-resistivity keybar that employs thin strips wedged between the keybar and attached components.

FIG. 6 shows an alternative embodiment 500 of the keybar in accordance with the present invention. This employs high-resistivity strips 18 wedged in a gap between the faces of the keybar dovetail and the dovetail slot 16 of laminations 20. Individual strips 19 are also wedged between the bolt portion of the keybar and the frame ring 28. These strips are made of a high resistivity material such as silicon carbide with surface resistance in the range discussed above. The strip need not be bonded to the faces of the dovetail, but can be wedged in the gap. Such high resistivity strip operates exactly like a coating to weaken the hazard currents. However, because since it is not attached to the keybar, a strip can avoid thermal expansion related issues.

What I claim is:

1. A coated keybar apparatus for protecting electric machines, the coated keybar apparatus comprising:
   a keybar and
   a semiconductive coating over an entire periphery of the keybar,
   wherein said semiconductive coating having a surface resistance in the range of 25 to 250 $\Omega cm^2$.

2. The coated keybar apparatus of claim 1, wherein the semiconductive coating comprising Silicon Carbide particles dispersed in a Nickel matrix.

3. The coated keybar apparatus of claim 1, wherein the semiconductive coating comprising Magnesium Fluoride particles dispersed in a Tin Oxide matrix.

4. A coated-throughbolt apparatus for protecting electric machines, comprising:
   a throughbolt and
   a semiconductive coating over an entire periphery of the throughbolt,
   wherein said semiconductive coating having surface resistance in the range of 25 to 250 $\Omega cm^2$.

5. The coated throughbolt apparatus of claim 4, wherein the semiconductive coating comprising Silicon Carbide particles dispersed in a Nickel matrix.

6. The coated throughbolt apparatus of claim 4, wherein the semiconductive coating comprising Magnesium Fluoride particles dispersed in a Tin Oxide matrix.

* * * * *